(12) United States Patent
Shin et al.

(10) Patent No.: US 7,510,288 B2
(45) Date of Patent: Mar. 31, 2009

(54) DISPLAY DEVICE USING EXTERNAL LIGHT

(75) Inventors: Yoon-cheol Shin, Gangnam-gu (KR); Moon-cheol Kim, Suwon-si (KR); Young-chol Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/708,338

(22) Filed: Feb. 21, 2007

(65) Prior Publication Data

US 2007/0195519 A1    Aug. 23, 2007

(30) Foreign Application Priority Data

Feb. 23, 2006    (KR)    ........................ 10-2006-0017872

(51) Int. Cl.
*F21V 9/00*    (2006.01)
(52) U.S. Cl. .............................. 362/2; 362/27; 362/607
(58) Field of Classification Search ..................... 362/1, 362/2, 27, 293, 561, 601, 602, 607, 612, 362/614, 623, 625; 349/65, 68, 80
See application file for complete search history.

(56) References Cited

U.S. PATENT DOCUMENTS

| | | | | |
|---|---|---|---|---|
| 4,747,672 A | * | 5/1988 | Yasuhara et al. | 349/65 |
| 5,748,237 A | * | 5/1998 | Ueda et al. | 349/68 |
| 7,303,323 B2 | * | 12/2007 | Choi et al. | 362/614 |
| 2006/0002150 A1 | * | 1/2006 | Kim | 362/625 |

FOREIGN PATENT DOCUMENTS

| | | |
|---|---|---|
| JP | 8-122534 A | 5/1996 |
| JP | 8-221001 A | 8/1996 |
| JP | 9-179119 A | 7/1997 |
| JP | 2000-9942 A | 1/2000 |

* cited by examiner

*Primary Examiner*—Y My Quach Lee
(74) *Attorney, Agent, or Firm*—Sughrue Mion, PLLC

(57) ABSTRACT

A display device using external light and including: a light guide panel guiding light; an internal light source disposed on at least one side of the light guide panel and supplying internal light to the light guide panel; an optical filter disposed on a rear surface of the light guide panel to be exposed to the outside, and reflecting light with specific wavelengths and transmitting light with wavelengths other than the specific wavelengths among the internal light emitted from the internal light source and external light; and a display panel forming an image using the internal light and the external light which are illuminated through the light guide panel and the optical filter. The display device improves visibility using both external light and internal light by simply adding the optical filter to an existing display device.

11 Claims, 5 Drawing Sheets

DISPLAY DEVICE USING EXTERNAL LIGHT

CROSS-REFERENCE TO RELATED PATENT APPLICATION

This application claims priority from Korean Patent Application No. 10-2006-0017872, filed on Feb. 23, 2006, in the Korean Intellectual Property Office, the disclosure of which is incorporated herein in its entirety by reference.

BACKGROUND OF THE INVENTION

1. Field of the Invention

The present invention relates to a display device using external light and, more particularly, to a display device using natural light or illumination light as a light source to improve visibility without greatly changing the structure of an existing display device.

2. Description of the Related Art

With the development of communication and display technology, a number of portable terminals have recently been developed. Examples of portable terminals include personal digital assistants (PDAs), portable multimedia players (PMPs), and digital multimedia broadcasting (DMB). Since liquid crystal displays (LCDs), a type of light receiving flat displays, cannot emit light by themselves, they produce an image by selectively transmitting illumination light radiated from a light source onto each pixel. To this end, backlight units are installed at a rear side of the LCDs.

Backlight units are classified according to the arrangement of light sources into a direct type and an edge type. The direct light type is configured such that a plurality of light sources are installed under an LCD to directly emit light onto a liquid crystal panel. The direct light type is suitable for large screen display devices, such as LCD TVs larger than 30 inches, since the light sources can be freely and effectively installed over a wide area. The edge light type is suitable for displays of portable terminals since a light source should be installed at a sidewall of a light guide panel.

Portable communication terminals are used in a wide variety of locations, and are often used in sunny outdoor conditions where the screen may be too dark to see, thereby decreasing the visibility of the display and reducing the portability of the portable communication terminals.

SUMMARY OF THE INVENTION

An aspect of the present invention is to provide a display device using sunlight or external illumination light as a light source in a simple manner to prevent visibility reduction due to external conditions, thereby improving its portability.

According to a non-limiting embodiment of the present invention, there is provided a display device comprising: a light guide panel guiding light; an internal light source disposed on at least one side of the light guide panel and supplying internal light to the light guide panel; an optical filter disposed on a rear surface of the light guide panel to be exposed to the outside, and reflecting light with specific wavelengths and transmitting light with wavelengths other than the specific wavelengths among the internal light emitted from the internal light source and external light; and a display panel forming an image using the internal light and the external light which are illuminated through the light guide panel and the optical filter.

The optical filter may reflect light with red, green, and blue wavelengths, and transmit light with wavelengths other than the red, green, and blue wavelengths.

The display device may further comprise a color filter disposed between the light guide panel and the display panel.

The color filter may transmit light with red, green, and blue wavelengths, and reflect light with wavelengths other than the red, green, and blue wavelengths.

BRIEF DESCRIPTION OF THE DRAWINGS

The above and other features and advantages of the present invention will become more apparent by describing in detail exemplary, non-limiting embodiments thereof with reference to the attached drawings in which.

DETAILED DESCRIPTION OF THE INVENTION

The present invention will now be described more fully with reference to the accompanying drawings, in which exemplary, non-limiting embodiments of the invention are shown.

Figure 1:
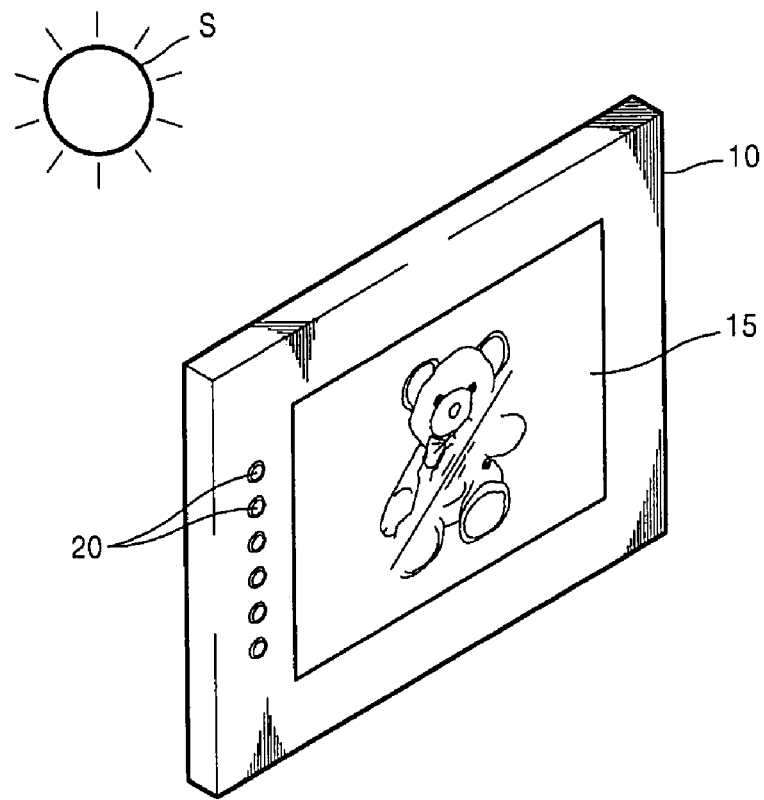
FIG. 1 is a perspective view of a display device according to a non-limiting embodiment of the present invention.
Figure 2:
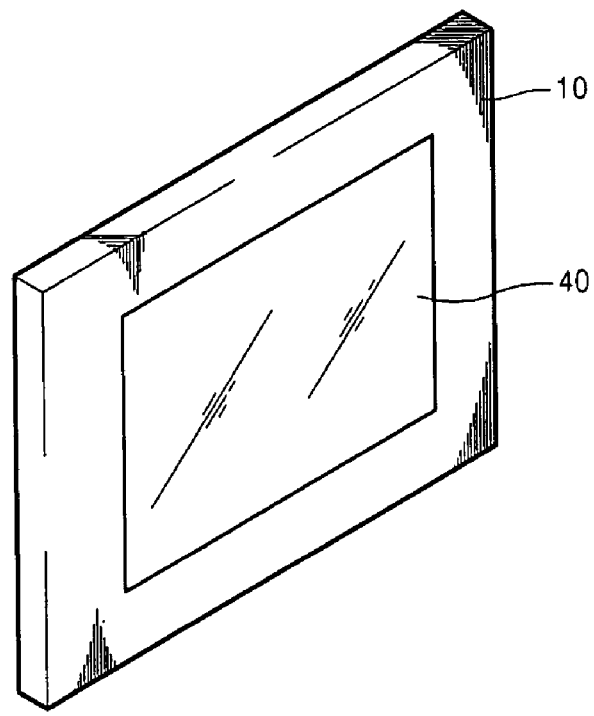
FIG. 2 is a rear perspective view of the display device of FIG. 1.

FIG. 1 is a perspective view of a display device according to a non-limiting embodiment of the present invention. FIG. 2 is a rear perspective view of the display device of FIG. 1. Referring to FIGS. 1 and 2, a screen 15 is disposed on a front surface of a display main body 10, and an optical filter 40 is disposed on a rear surface of the display main body 10. The optical filter 40 is exposed to the outside of the display device and allows light emitted from an external light source S, such as sunlight or external illumination light, to be incident on the display main body 10 therethrough.

The display device of the present non-limiting embodiment can be applied to, for example, portable terminals such as personal digital assistants (PDAs), portable multimedia players (PMPs), or digital multimedia broadcasting (DMB), but is not limited thereto. Whether the display device is configured as a folding type or slide mobile phone, such that a screen and input units are formed on the same body, or configured such that a screen and input units are formed on different bodies, the display main body 10 corresponds to a display unit having the screen formed thereon. FIGS. 1 and 2 exemplarily show that the screen 15 and input units 20 are formed on the same body.

Figure 3:
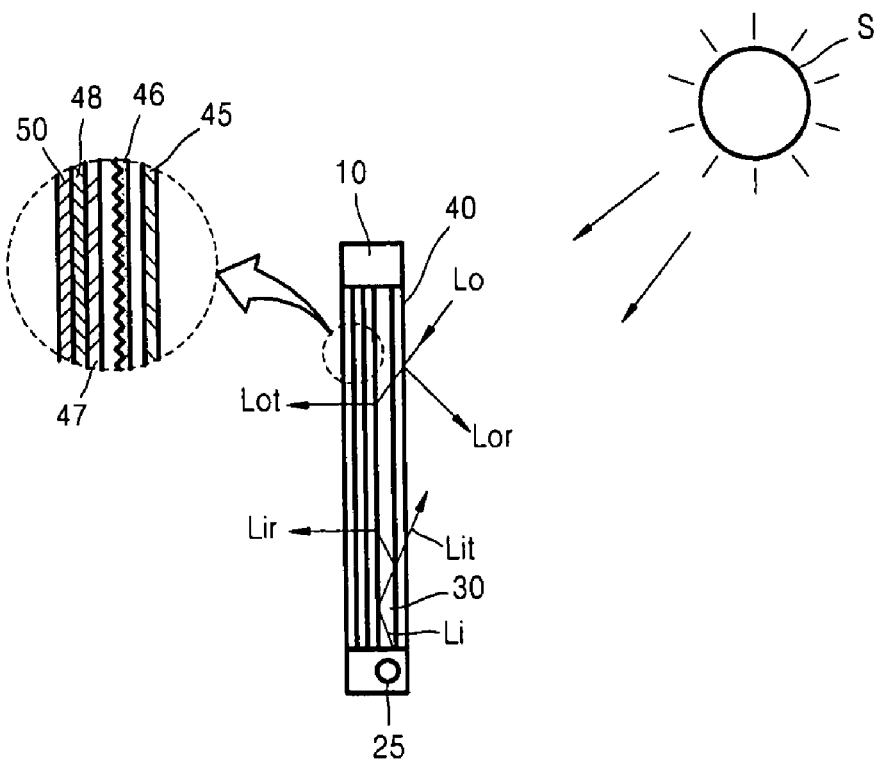
FIG. 3 is a vertical cross-sectional view of the display device of FIG. 1.
Figure 4:
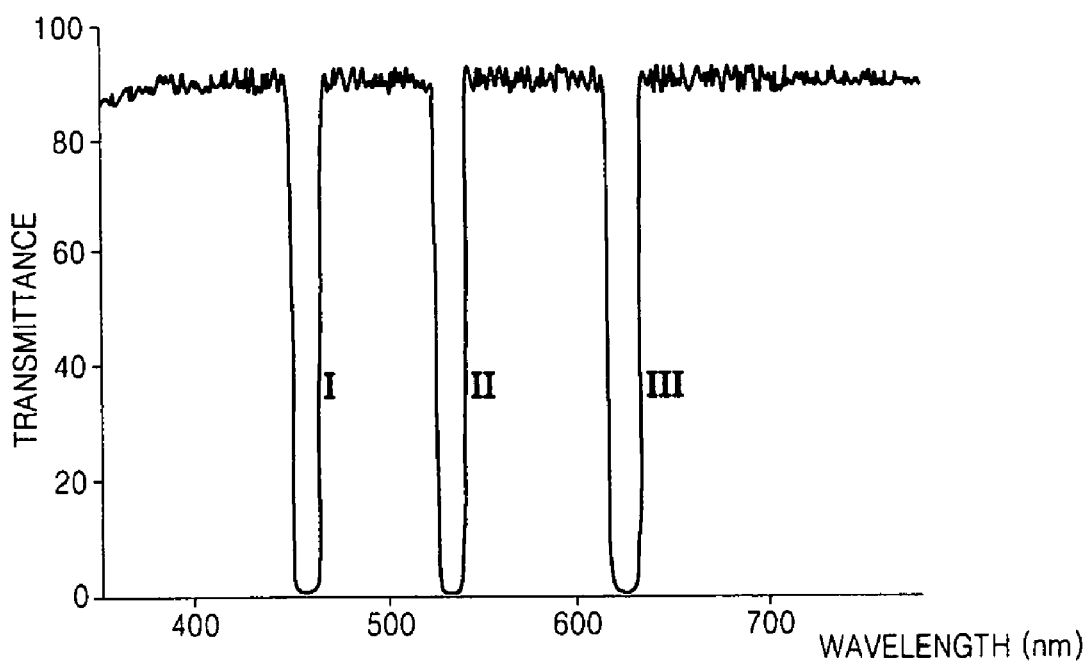
FIG. 4 is a graph illustrating a relationship between the transmittance of an optical filter disposed on the display device of FIG. 1 and the wavelength of light transmitted through the optical filter.

FIG. 3 is a vertical cross-sectional view of the display device of FIG. 1. An internal light source 25 and a light guide panel 30 for guiding light are installed in the display main body 10. The internal light source 25 is disposed on at least one side of the light guide panel 30. The optical filter 40 is disposed on a rear surface of the light guide panel 30, and reflects light with specific wavelengths and transmits light with wavelengths other than the specific wavelengths. FIG. 4 is a graph illustrating a relationship between the transmittance of the optical filter 40 and the wavelength of light transmitted through the optical filter 40. Referring to FIG. 4, the optical filter 40 reflects light with first through third wavelengths I, II, and III, and transmits light with wavelengths other than the first through third wavelengths I, II, and III. Although the optical filter 40 reflects the light with the three wavelengths in FIG. 4, the optical filter 40 may reflect light with four wavelengths. For example, the first through third wavelengths I, II, and III may be blue B, green G, and red R wavelengths, respectively. The following is an explanation of this example.

A display panel 50 is disposed in front of the light guide panel 30, and forms an image using light supplied through the light guide panel 30. A diffusion plate 45 diffusing light, a first prism sheet 46 correcting the path of light, and a second prism sheet 47 perpendicular to the first prism sheet 46 are disposed between the light guide panel 30 and the display panel 50. The display panel 50 may, for example, be a liquid crystal panel. The display panel 50 modulates external light for each pixel according to an input image signal to form an image. A color filter 48 is disposed on the display panel 50, and supplies separated color light beams to form a color image.

The color filter 48 may separate white light incident on the display panel 50 through the light guide panel 30 into red R, green G, and blue B light beams, and supplies the separated three beams to the display panel 50. The display panel 50 modulates the red R, green G, and blue B light beams for each pixel according to an input signal to form a color image.

The optical filter 40 selectively reflects or transmits internal light Li emitted from the internal light source 25 as shown in FIG. 3. While light Lir reflected by the optical filter 40 travels toward the display panel 50, light Lit transmitting through the optical filter 40 goes to the outside. Also, the optical filter 40 reflects some light Lor and transmits the rest of the light Lot among external light Lo emitted from the external light source S. The light Lot transmitted through the optical filter 40 is supplied to the display panel 50 through the light guide panel 30. Accordingly, the light Lir emitted from the inner source 25 and reflected by the optical filter 40 and the light Lot emitted from the external light source S and transmitted through the optical filter 40 are supplied to the display panel 50.

While the amount of light emitted from the internal light source 25 is constant, the amount of light emitted from the external light source S greatly depends on external conditions. Accordingly, the amount of light supplied to the display panel 50 is greatly affected by the external light source S. That is, an image is mainly formed using light emitted from the internal light source 25 indoors where external light is insufficient whereas an image is mainly formed using light emitted from the external light source S outdoors where external light is sufficient. Accordingly, when the display device is used in the sunny outdoors, both internal light and sunlight are supplied to the display panel 50 to form an image, thereby improving visibility. Hence, the portable display device of the present non-limiting embodiment can be used even in the sunny outdoors.

The operation of the display device of FIG. 1 using the optical filter 40 will now be explained in detail.

Figure 5:
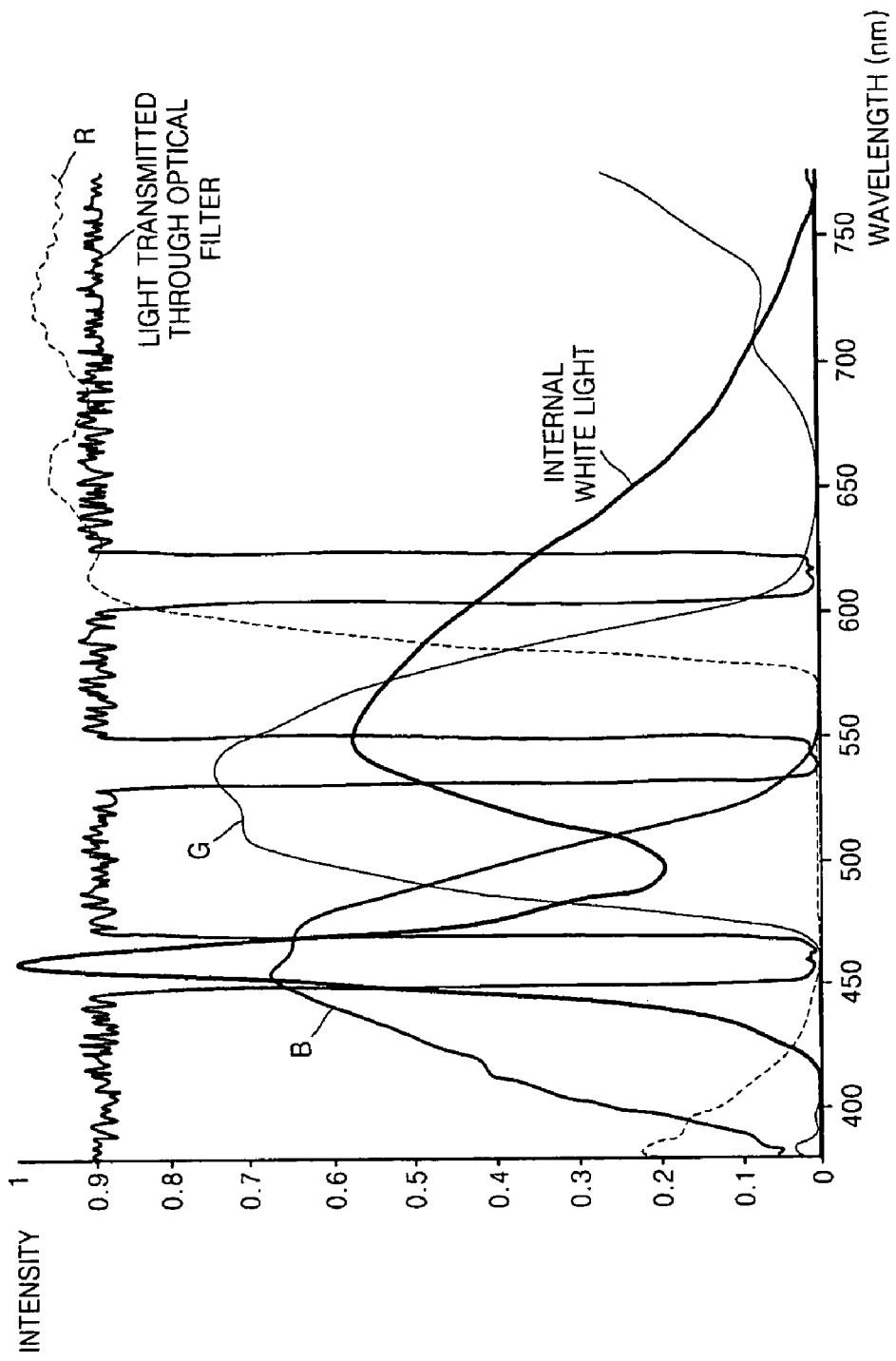
FIG. 5 is a graph illustrating a relationship between intensity and wavelength for each of white light emitted from an internal light source, light transmitted through the optical filter, and light transmitted through a color filter in the display device of FIG. 1.

FIG. 5 is a graph illustrating a relationship between intensity and wavelength for light emitted from the internal light source 25, light transmitted through the optical filter 40, and light transmitted through the color filter 48 in the display device of FIG. 1.

Referring to FIG. 5, the internal light source 25, such as, for example, a light emitting diode (LED), or a cold cathode fluorescent lamp (CCFL), supplies white light. The optical filter 40 reflects light with blue B, green G, and red R wavelengths and transmits light with wavelengths other than the blue B, green G, and red C wavelengths. The color filter 48 transmits light with blue Bc, green Gc, and red Rc wavelengths. Here, in order to tell the wavelengths filtered by the optical filter 40 from the wavelengths filtered by the color filter 48, each of the wavelengths filtered by the color filter 48 is indicated with a subscript c.

Figure 6:
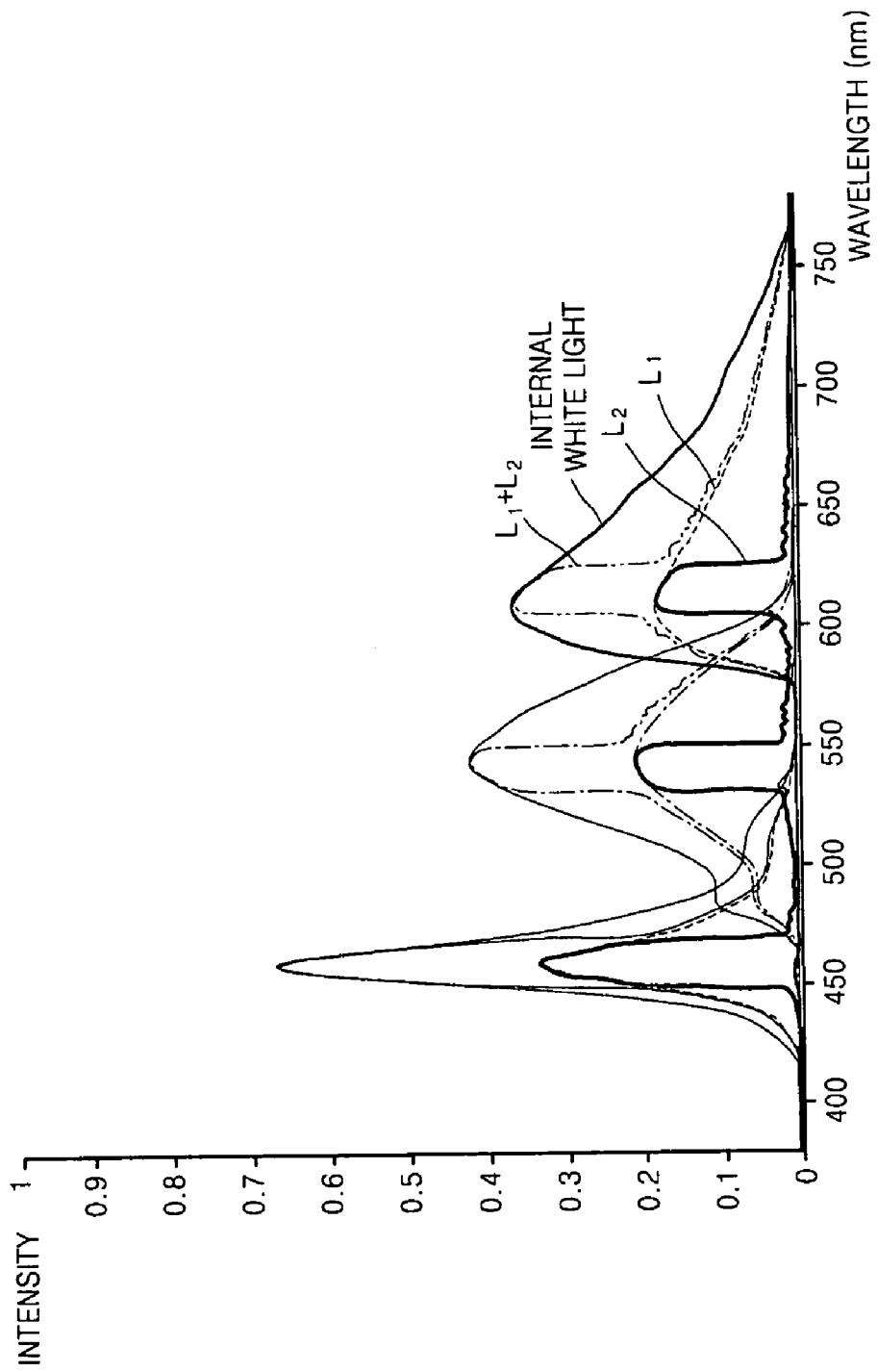
FIG. 6 is a graph illustrating a relationship between intensity and wavelength for explaining the way in which light emitted from the internal light source inside the display device of FIG. 1 illuminates a display panel.

FIG. 6 is a graph illustrating a relationship between intensity and wavelength for explaining the way in which light emitted from the internal light source 25 inside the display device of FIG. 1 illuminates the display panel 50.

Referring to FIG. 6, white light emitted from the internal light source 25 is divided into first light L1, which is incident on the color filter 48 through the light guide panel 30, without passing through the optical filter 40, and second light L2, which is reflected by the optical filter 40 and then is incident on the color filter 48. Accordingly, the first light L1 and the second light L2 are mixed to illuminate the color filter 48. Part of the second light L2, reflected by the optical filter 40, goes to the outside and thus the white light emitted from the internal light source 25 is partially lost. However, the amount of light lost due to the optical filter 40 can be lowered so as not to affect the way in which the image is formed using the first light L1 and the second light L2, and can also be compensated by adjusting the intensity of the white light emitted from the internal light source 25.

Figure 7:
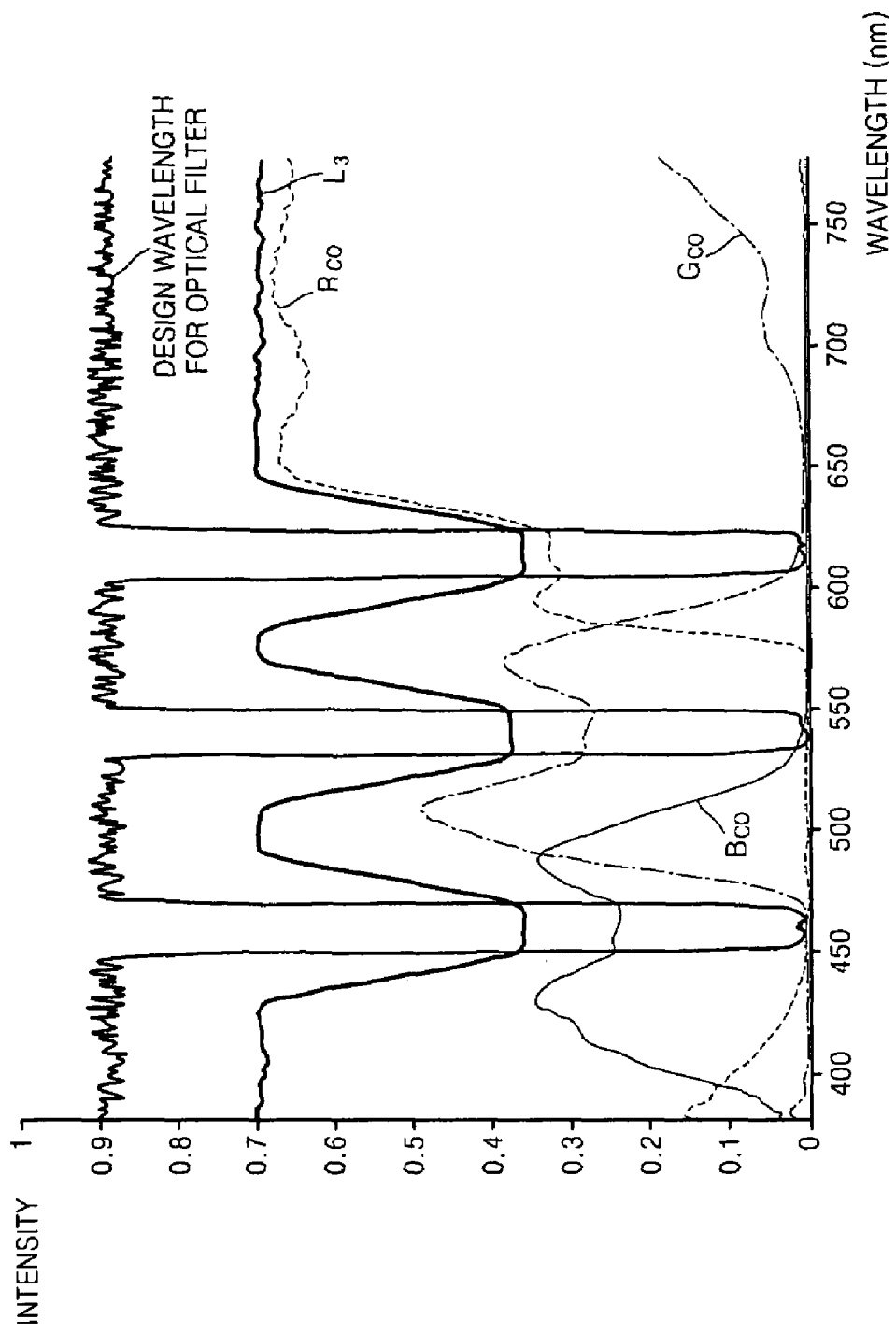
FIG. 7 is a graph illustrating a relationship between intensity and wavelength for explaining the way in which light emitted from an external light source outside the display device of FIG. 1 illuminates the display panel.

FIG. 7 is a graph illustrating a relationship between intensity and wavelength for explaining the way in which light emitted from the external light source S outside the display device of FIG. 1 illuminates the display panel 50. When external white light is incident on the optical filter 40, light with red (R), green G, and blue B wavelengths are reflected by the optical filter 40, and light with wavelengths other than the red R, green G, and blue B wavelengths are transmitted through the optical filter 40 and then pass through the light guide panel 30, the diffusion plate 35, and the first and second prism sheets 46 and 47. The filtering characteristics of the optical filter 40 vary depending on the angle of light incident thereon. That is, when the angle of light incident on the optical filter 40 is large, the filtering characteristics of the optical filter 40 are maintained, and when the angle of light incident on the optical filter 40 is small, the filtering characteristics of the optical filter 40 are changed. Since most of light emitted from the internal light source 25 is incident at a large angle on the optical filter 40, the optical filter 40 reflects light with red R, green G, and blue B wavelengths according to its filtering characteristics. However, since external light is incident in various directions on the optical filter 40, the optical filter 40 may transmit or reflect light with wavelengths greater than design wavelengths. In other words, the external light is less subjected to the filtering characteristics of the optical filter 40 than the internal light is. Referring to FIG. 7, the third light L3 of the external light which passes through the optical filter 40 is less subjected to the filtering characteristics of the optical filter 40 than is light with the design wavelengths.

Next, the third light L3 is separated into light with red Rco, green Gco, and blue Bco wavelengths by the color filter 48, and then is incident on the display panel 50. The relative intensities of the light at respective steps are shown in FIG. 7.

As described above, the first light L1 and the second light L2 emitted from the internal light source 25, and the third light L3 emitted from the external light source S, are incident on the color filter 48 through the diffusion plate 45 and the first and second prism sheets 46 and 47, separated into the red R, green G, and blue B wavelengths by the color filter 48, and then supplied to the display panel 50 to form a color image. Since the red, green, and blue wavelengths transmitted by the color filter 48 are greater than the red, green, and blue wavelengths reflected by the optical filter 40, a very large amount of the light emitted from the external light source S and passing through the optical filter 40 is supplied to the display panel 50 through the color filter 48 to form the color image, thereby improving the brightness of the image.

The display device of the present non-limiting embodiment can improve visibility by forming an image in dark indoor conditions using internal light emitted from the inner source 25 and by forming an image in bright outdoor conditions using both internal light emitted from the internal light source 25 and external light. In particular, when sunlight is used as the external light, since the brightness of the sunlight is very high, the amount of the internal light lost due to the optical filter 40 can be compensated by the sunlight.

Also, the display device of the present non-limiting embodiment can use external light in a simple manner by employing the color filter 48 instead of a reflective plate of the light guide panel 30 without greatly changing the structure of an existing display device.

As described above, the display device of the present non-limiting embodiment can improve visibility using external light and internal light by simply adding the optical filter 40 without greatly changing the structure of an existing display device. Also, the display device of the present non-limiting embodiment can improve portability by improving visibility using external light such as sunlight or illumination light.

While the present invention has been particularly shown and described with reference to exemplary, non-limiting embodiments thereof, it will be understood by those of ordinary skill in the art that various changes in form and details may be made therein without departing from the spirit and scope of the present invention as defined by the following claims.

What is claimed is:

1. A display device comprising:
   a light guide panel;
   an internal light source operative to supply internal light to the light guide panel;
   an optical filter disposed on a rear surface of the light guide panel to be exposed to the outside of the display device, and operative to reflect light with specific wavelengths and transmit light with wavelengths other than the specific wavelengths, among both the internal light emitted from the internal light source and external light; and
   a display panel operative to form an image using the internal light and the external light which are illuminated through the light guide panel and the optical filter,
   wherein a filtering characteristic of the optical filter with respect to the external light is less sharp than a filtering characteristic of the optical filter with respect to the internal light.

2. The display device of claim 1, wherein the optical filter reflects light with red, green, and blue wavelengths, and transmits light with wavelengths other than the red, green, and blue wavelengths.

3. The display device of claim 1, further comprising a color filter disposed between the light guide panel and the display panel.

4. The display device of claim 3, wherein the color filter transmits light with red, green, and blue wavelengths, and reflects light with wavelengths other than the red, green, and blue wavelengths.

5. The display device of claim 1, wherein the display panel is a liquid crystal panel.

6. The display device of claim 1, wherein the internal light source is a light emitting diode (LED) or a cold cathode fluorescent lamp (CCFL) which emits white light.

7. The display device of claim 1, wherein the internal light source is disposed on at least one side of the light guide panel.

8. The display device of claim 1, further comprising a diffusing plate, a first prism sheet and a second prism sheet disposed between the light guide panel and the display panel.

9. The display device of claim 8, wherein the second prism sheet is disposed perpendicular to the first prism sheet.

10. The display device of claim 1, wherein the optical filter is disposed directly on the rear surface of the light guide panel.

11. The display device of claim 1, wherein the optical filter is exposed to the outside of the display device by forming part of an outer surface of the display device.

* * * * *